(12) United States Patent
Klein

(10) Patent No.: US 9,862,223 B2
(45) Date of Patent: Jan. 9, 2018

(54) BINDER CLIP

(71) Applicant: Jeff Klein, Lake Oswego, OR (US)

(72) Inventor: Jeff Klein, Lake Oswego, OR (US)

(73) Assignee: Jeff Klein, Lake Oswego, OR (US)

( * ) Notice: Subject to any disclaimer, the term of this patent is extended or adjusted under 35 U.S.C. 154(b) by 0 days.

(21) Appl. No.: 15/407,142

(22) Filed: Jan. 16, 2017

(65) Prior Publication Data

US 2017/0120664 A1    May 4, 2017

Related U.S. Application Data

(63) Continuation-in-part of application No. 14/539,988, filed on Nov. 12, 2014, now Pat. No. 9,545,812.

(60) Provisional application No. 61/903,868, filed on Nov. 13, 2013.

(51) Int. Cl.
| | | |
|---|---|---|
| *B42F 1/00* | (2006.01) | |
| *F16B 2/24* | (2006.01) | |
| *F16B 45/00* | (2006.01) | |
| *F16B 2/22* | (2006.01) | |
| *B65D 67/02* | (2006.01) | |
| *F16B 45/02* | (2006.01) | |

(52) U.S. Cl.
CPC .......... *B42F 1/006* (2013.01); *B65D 67/02* (2013.01); *F16B 2/22* (2013.01); *F16B 2/245* (2013.01); *F16B 45/02* (2013.01)

(58) Field of Classification Search
CPC .... B42F 1/006; B42F 1/06; F16B 2/22; F16B 2/245; F16B 45/00; B65D 67/02; Y10T 24/203; Y10T 24/20; Y10T 24/202

USPC ........................... 24/67.3, 67.5, 67.7
See application file for complete search history.

(56) References Cited

U.S. PATENT DOCUMENTS

| | | | |
|---|---|---|---|
| 360,960 | A | 4/1887 | Hamilton |
| 881,514 | A | 3/1908 | Wiedeman |
| 1,139,627 | A | 5/1915 | Baltzley |
| 2,933,790 | A | 4/1960 | Hudson |
| 3,135,034 | A | 6/1964 | Fauteux |
| 3,862,556 | A | 1/1975 | Moses |
| 3,923,213 | A | 12/1975 | George et al. |
| 4,044,928 | A | 8/1977 | Watanabe |
| 4,169,549 | A * | 10/1979 | Takagi ............... A47G 25/483 223/96 |
| 5,533,236 | A | 7/1996 | Tseng |
| 5,619,789 | A | 4/1997 | Chung |
| 5,896,624 | A | 4/1999 | Horswell |
| 5,950,283 | A | 9/1999 | Sato |
| 6,374,463 | B1 | 4/2002 | Kaufman |
| 7,264,285 | B1 | 9/2007 | Ross |
| 7,730,593 | B1 | 6/2010 | Juilly |
| 7,922,207 | B2 | 4/2011 | Hoarau et al. |
| 2001/0032376 | A1 | 10/2001 | Payne |
| 2006/0130288 | A1 | 6/2006 | Carls |

(Continued)

*Primary Examiner* — Robert J Sandy
*Assistant Examiner* — Rowland Do
(74) *Attorney, Agent, or Firm* — Alleman Hall Creasman & Tuttle LLP

(57) ABSTRACT

A binder clip includes a generally triangular clamp, a catch arm, and a hook arm. The catch arm includes a linear segment having a catch width, and the hook arm includes a hook configured for secure but releasable connection around the linear segment of a matching binder clip. The hook has a hook width less than the catch width of the linear segment.

16 Claims, 7 Drawing Sheets

(56) References Cited

U.S. PATENT DOCUMENTS

2010/0320355 A1* 12/2010 Chen .................. B42F 9/008
  248/451
2012/0251269 A1* 10/2012 Mindler ............... B42F 1/06
  412/6

* cited by examiner

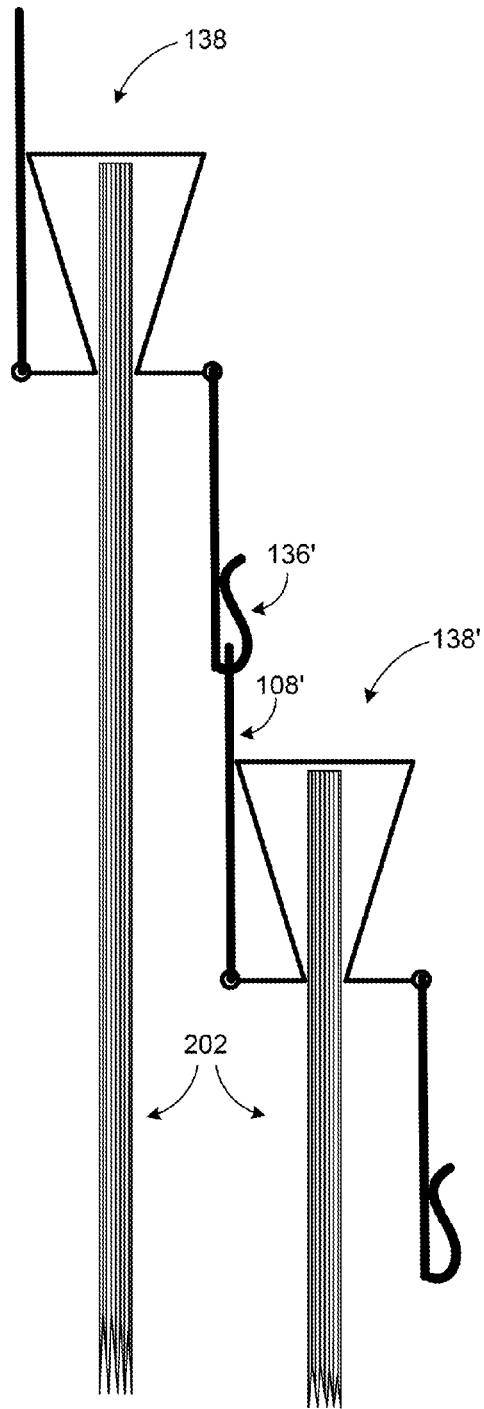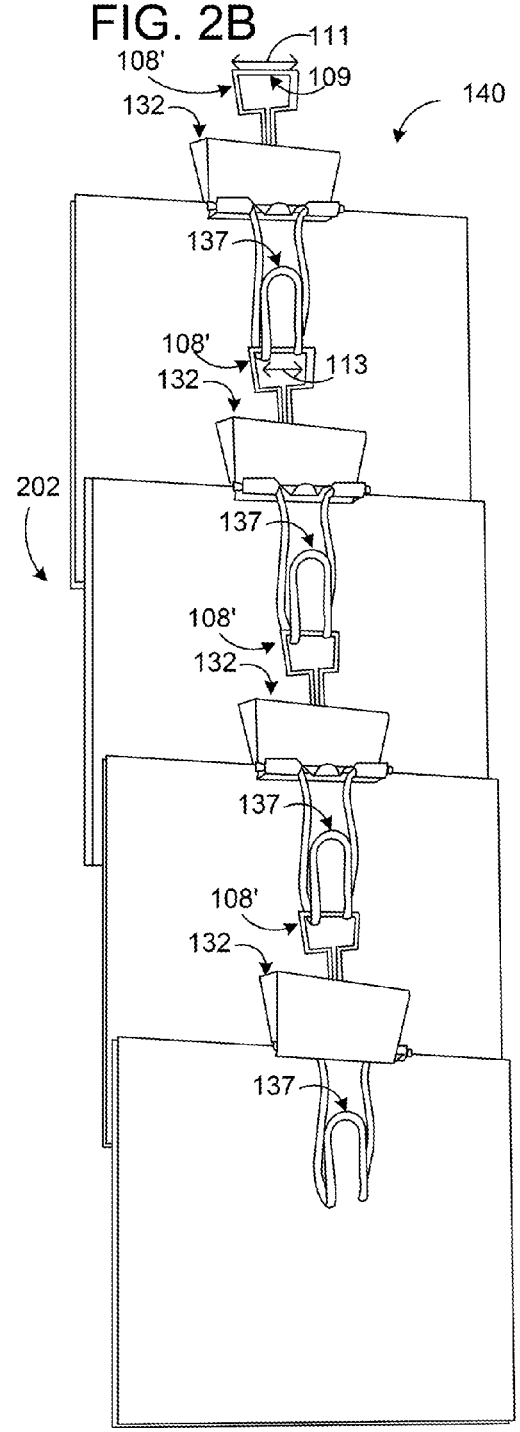

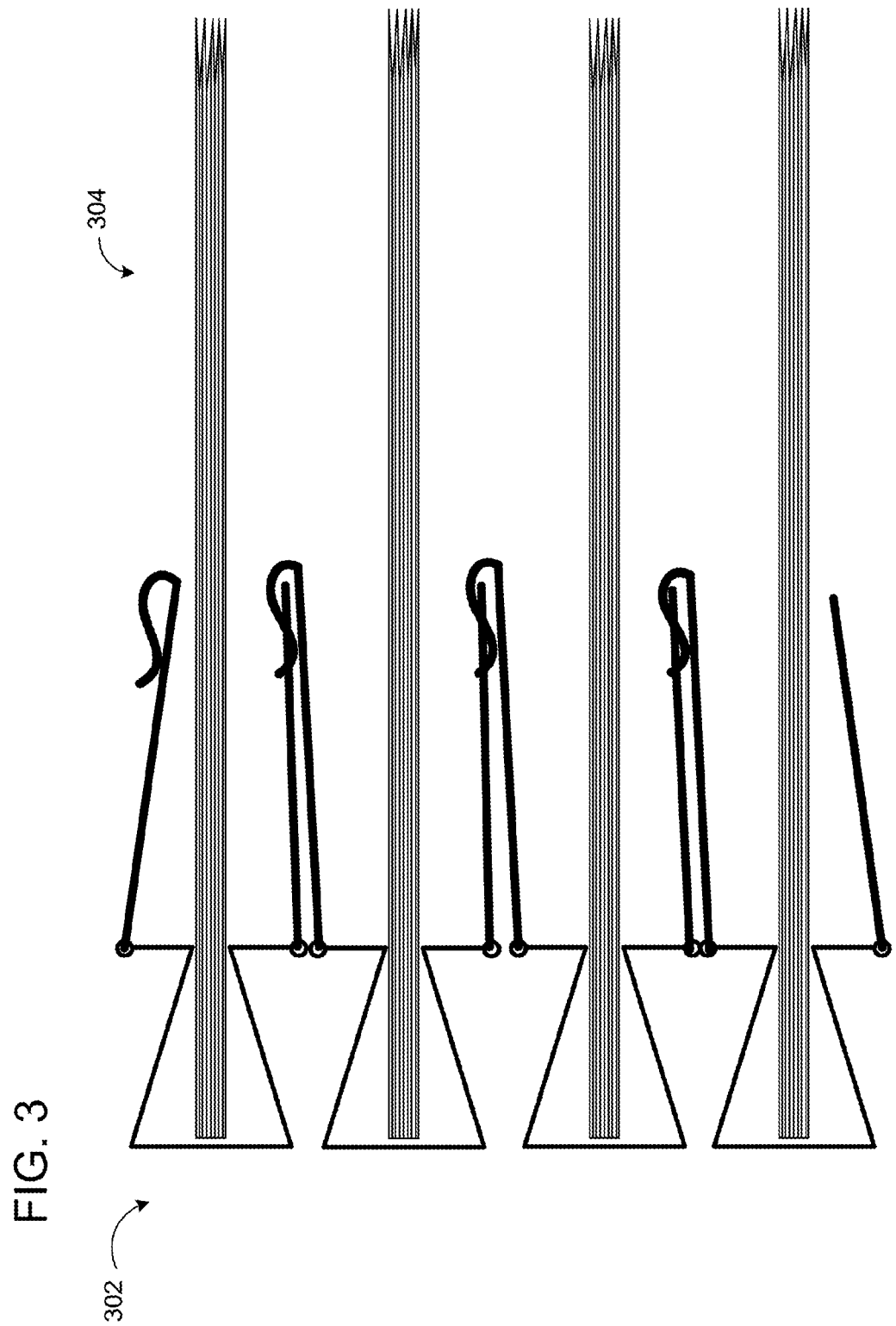

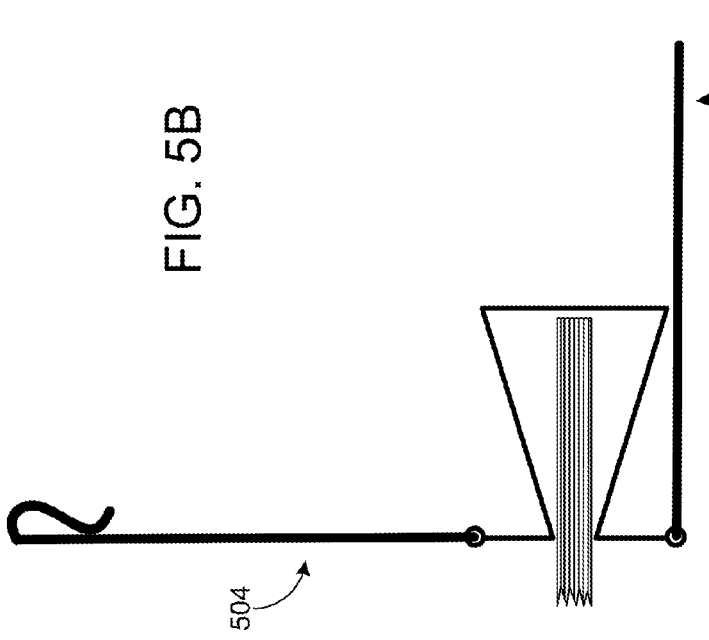
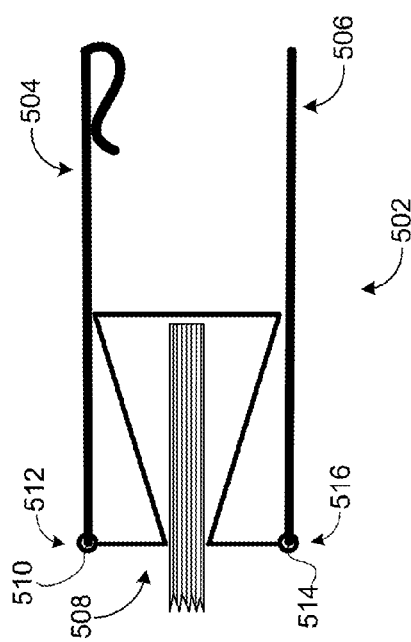
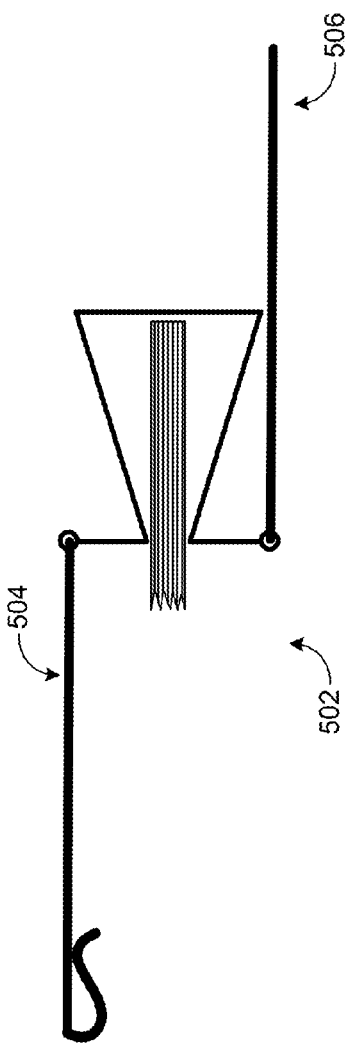

BINDER CLIP

CROSS-REFERENCE TO RELATED APPLICATIONS

This application is a continuation-in-part from U.S. patent application Ser. No. 14/539,988 filed Nov. 12, 2014, which claims priority to U.S. Provisional Patent Application Ser. No. 61/903,868, titled BINDER CLIP and filed Nov. 13, 2013, the disclosures of each of which are hereby incorporated by reference in its entirety.

BACKGROUND

Keeping documents organized can be challenging. A paper binder clip may be used to clamp a stack of documents and maintain their organization. However, if one attempts to further stack clamped stacks, the clamped stacks may slip relative to the other clamped stacks, which may cause the clamped stacks to become disorganized. Therefore, there exists a need for a paper binder clip that enables paper binder clips to be neatly arranged relative to one another.

BRIEF DESCRIPTION OF THE DRAWINGS

FIG. 2A shows binder clips that match the binder clip of FIG. 1E removably linked together in accordance with an embodiment of the present disclosure.

FIG. 2B shows binder clips that match the binder clip of FIG. 1C removably linked together in accordance with an embodiment of the present disclosure.

FIG. 3 shows binder clips that match the binder clip of FIG. 1E removably linked together and stacked in accordance with an embodiment of the present disclosure.

FIGS. 5A-5C respectively show three angular biases of a binder clip.

DETAILED DESCRIPTION

Figure 1A:
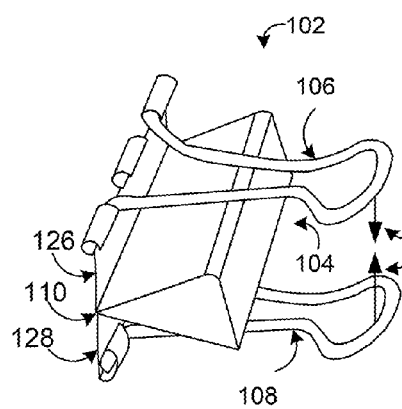
FIGS. 1A-1F show example binder clips in accordance with embodiments of the present disclosure.

FIG. 1A shows a binder clip 102 that includes a clamp 104, a first arm 106, and a second arm 108. Clamp 104 exhibits a generally triangular geometry and includes a mouth 110 that can be opened by pinching first arm 106 and second arm 108 together as indicated by arrows 112. Clamp 104 is biased towards a closed position, such that releasing the pinching force allows the mouth to close. First and second arms 106 and 108 are thus cooperatively useable to open and close mouth 110 to clamp the mouth around a stack of documents or other objects.

Figure 1B:
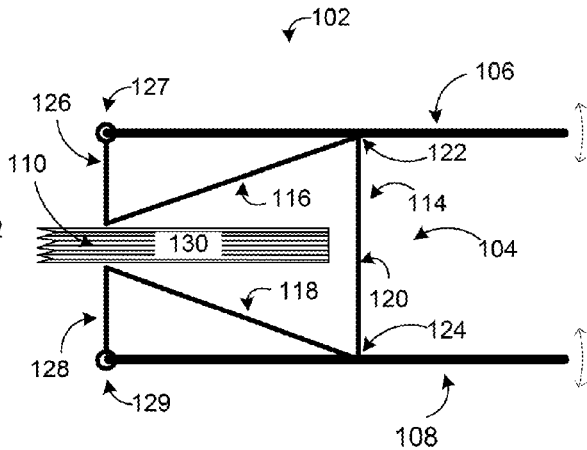

FIG. 1B shows binder clip 102 in cross section. As can be seen in FIG. 1B, clamp 104 includes a body 114 that has a substantially triangular cross sectional shape with a first side 116, a second side 118, and a third side 120. First side 116 extends between mouth 110 and a first vertex 122, second side 118 extends between the mouth and a second vertex 124, and third side 120 extends between the first vertex and the second vertex.

As shown in FIG. 1B, binder clip 102 further includes a first wing 126 extending away from mouth 110 (and first side 116) to a first wing end 127, and a second wing 128 extending away from the mouth (and second side 118) to a second wing end 129. In the depicted implementation, first and second wings 126 and 128 extend in opposite directions from mouth 110. Further, in the state depicted in FIG. 1B, first and second wings 126 and 128 are substantially coplanar, and the first wing, the second wing, and third side 120 are substantially parallel. In some implementations, first side 116, second side 118, third side 120, first wing 126, and second wing 128 may be contiguously formed from a bent piece of metal, though implementations are possible in which one or more of these components are formed separately from metal, plastic, or one or more other materials.

To enable rotational motion of first and second arms 106 and 108, and opening and closing of mouth 110, the arms are pivotably connected to their respective wings. Specifically, first arm 106 is pivotably connected to first wing 126 at first wing end 127, and second arm 108 is pivotably connected to second wing 128 at second wing end 129. Fulcrums about which the arms may rotate are formed at first and second vertices 122 and 124 such that first arm 106 pivots about first vertex 122, and second arm 108 pivots about second vertex 124. In this configuration, first and second arms 106 and 108 are substantially perpendicular to first wing 126, second wing 128, and third side 120. Further, first and second arms 106 and 108 are substantially parallel when respectively resting against first and second vertices 122 and 124.

Via mouth 110 opening and closing, binder clip 102 may clamp objects together. For example, binder clip 102 may clamp sheets of paper 130 together in mouth 110. As another example, the binder clip 102 may clamp personal belongings together such as cash or credit cards. Additional detail regarding the pivoting connection of first and second arms 106 and 108 is provided below with reference to FIG. 6.

Figure 1C:
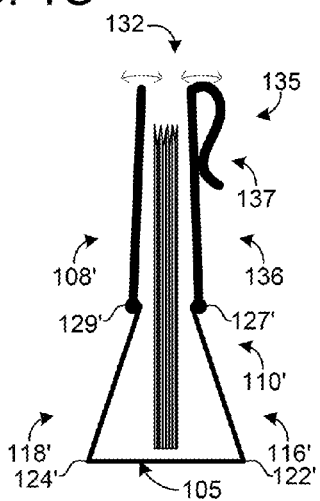

Turning now to FIG. 1C, a binder clip 132 without wings 126 and 128 of FIG. 1A and FIG. 1B is shown. Binder clip 132 includes a generally triangular clamp having—a first side 118' between a first vertex 124' and a first mouth end 129', a second side 116' between a second vertex 122' and a second mouth end 127', and a third side 105 between the first vertex and the second vertex. The generally triangular clamp may be made from metal, plastic, a combination of metal and plastic, or another suitable material.

Binder clip 132 includes a hook arm 136 which includes an S-shaped hook 137 positioned at a distal end 135 of the hook arm. As binder clip 132 lacks the wings of binder clip 102, its arms are pivotably connected at mouth 110'—specifically, hook arm 136 is pivotably connected to second side 116' at mouth 110' and configured to pivot about second mouth end 127', and a catch arm 108' is pivotably connected to first side 118' at the mouth and configured to pivot about first mouth end 129'. While S-shaped hook 137 is shown in FIG. 1C as being positioned on an outer side of binder clip 132, it will be appreciated that the hook may instead be positioned on an inner side opposite the outer side—e.g., facing objects that may be clamped in the binder clip.

It will be appreciated that the S-shaped geometry of hook 137 is provided as an example and is not intended to be limiting. Hooks may be imbued with various other suitable geometries without departing from this disclosure, including but not limited to J-shapes, C-shapes (e.g., closed hooks that form a closed loop with an arm), D-shapes, sinuous and flexuous shapes, rectangular, triangular, and parabolic geometries, etc.

The first side 118', the second side 116', and the third side 105 cooperate to bias the first mouth end 129' toward the second mouth end 127' for clamping items between the first mouth end and the second mouth end.

Several matching binder clips having the configuration of binder clip 132 of FIG. 1C are shown securely but releasably attached to one another in FIG. 2B. Catch arm 108' includes a linear segment 109 having a catch width 111. The linear segment is substantially parallel to a third side between the first vertex and the second vertex. Hook arm 136 includes a hook 137 configured for secure but releasable connection around a linear segment 109 of a matching binder clip. The hook has a hook width 113 that is less than the catch width 111 of the linear segment 109.

Figure 1D:
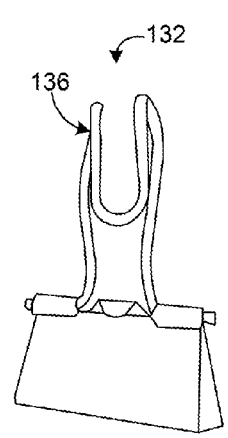

FIG. 1D shows a different view of hook arm 136. In the illustrated embodiment, only one arm is hooked. In other embodiments, both arms may be hooked. Hook arms may be variously formed with wire, sheet material, or other suitable materials without departing from the scope of this disclosure. The hook arm and/or the clamp arm may be made from metal, plastic, a combination of metal and plastic, or another suitable material.

Whether hooked or unhooked, in some embodiments arms may be constructed from wire that is bent into decorative shapes (e.g., robot, cat, star, heart, arrow, cross, cartoon character, letter, etc.), which may enhance the aesthetic appearance and/or industrial design of a binder clip and enable its customization.

Figure 1E:
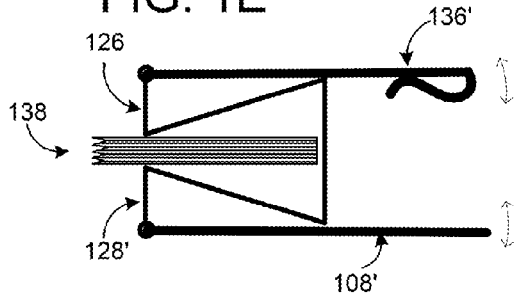

FIG. 1E shows a binder clip 138 that includes a hook arm 136' and an unhooked arm 108', along with wings 126' and 128'. Unhooked arm 108' is a second arm that functions as a catch arm—that is, the unhooked arm may be configured to catch the hook (e.g., hook 137) of another binder clip, which may enable two or more binder clips to be releasably secured to each other. As such, unhooked arm 108' may be geometrically adapted to achieve a secure but releasable fit with a corresponding hook. A binder clip may be imbued with one hook arm and one unhooked arm regardless of whether the binder clip includes wings (e.g., binder clip 132 of FIG. 1C). In some embodiments, a winged or unwinged clip may include two hook arms. Further, a binder clip may be provided having at least one arm that is a combined hook and catch arm—that is, the combined hook and catch arm provides both hooking and catching functionality when paired with a suitable arm.

Figure 1F:
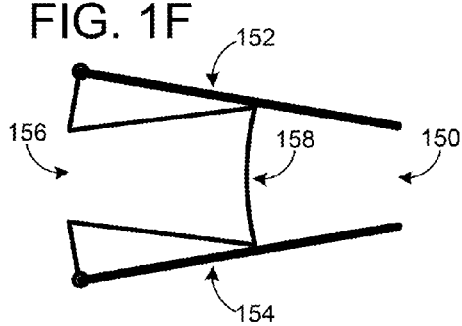

FIG. 1F illustrates aspects of the rotational motion of a binder clip 150. Binder clip 150 is shown in a partially pivoted state in which its first and second arms 152 and 154 have been pivoted toward each other to open a mouth 156. A connecting surface 158 of binder clip 150, which provides the pivot points about which the first and second arms may rotate, bends as the arms are pivoted toward each other. In this implementation, connecting surface 158 is physically and materially configured to facilitate this bending. For example, the connecting surface may be slightly bowed towards the mouth. The connecting surface is configured to flexibly return to a slightly bowed state with mouth 156 closed. Such a configuration may allow binder clip 150 to be flexibly rotated without unevenly distributing force throughout the clip, increasing the structural integrity and operational life of the clip. Approaches are possible, however, in which connecting surface 158 is comprised of two sections that are attached together at a pivot. As the binder clip arms are pivoted toward each other, the two sections in turn rotate about the pivot, remaining substantially planar. It will be appreciated that either configuration may apply to any of the binder clips described herein, including binder clip 132, which does not include wings. For example, returning briefly to FIG. 1C, pivoting the catch arm 108' against the first vertex 124' and pivoting the hook arm 136 against the second vertex 122' separates the first mouth end from the second mouth end to admit items for clamping between the first mouth end and the second mouth end. It is to be understood that FIG. 1C shows the mouth ends separated from one another, although they typically will be clamped to one another absent the above described pivoting forces to overcome the bias.

FIG. 2A shows two binder clips 138 and 138', which are shown as simultaneously clamping stacks of paper 202 while remaining linked to each other. Binder clips 138 and 138' are removably linked via hook arm 136' and unhooked arm 108'. As discussed above, the S-shape of hook arm 136' allows for the secure but releasable connection of unhooked arm 108' thereto. In the illustrated example, unhooked arm 108' is approximately T-shaped. The width of T-shape unhooked arm 108' may be sized to limit sliding of S-shaped hook arm 136' within unhooked arm 108' while fastened. The T-shape of unhooked arm 108' provides a flat surface for the fastening of hook arm 136' in a fast and secure manner. It will be appreciated, however, that the T-shape of unhooked arm 108' is provided as an example and is not intended to be limiting. Generally, an unhooked arm may be provided that is generally configured as a catch arm operable to catch a hook arm connected to the clamp of another binder clip. However, as described above, a binder clip may be provided that includes a first hook arm and a second hook arm, where the second hook arm is configured to hook the catch arm of another binder clip.

FIG. 2B shows a plurality of linked matching binder clips 132, where each binder clip simultaneously clamps stacks of paper 202. It is to be understood that binder clips in accordance with this disclosure may be removably linked with or without having wings (e.g., wings 126 and 128 of FIG. 1B).

FIG. 3 shows a plurality of linked binder clips 302 removably linked so that clamped paper stacks 304 may be stacked neatly while the binder clips stay linked. The plurality of linked clips 302 may be arranged such that the hook and unhooked arms are opposed to allow for linkage. FIG. 3 shows one such configuration with all arms extending to the right, though it will be appreciated that the plurality of binder clips 302 may be arranged with all arms extending to the left. The plurality of linked binder clips 302 may be linked with or without having wings, as described above.

Figure 4A:
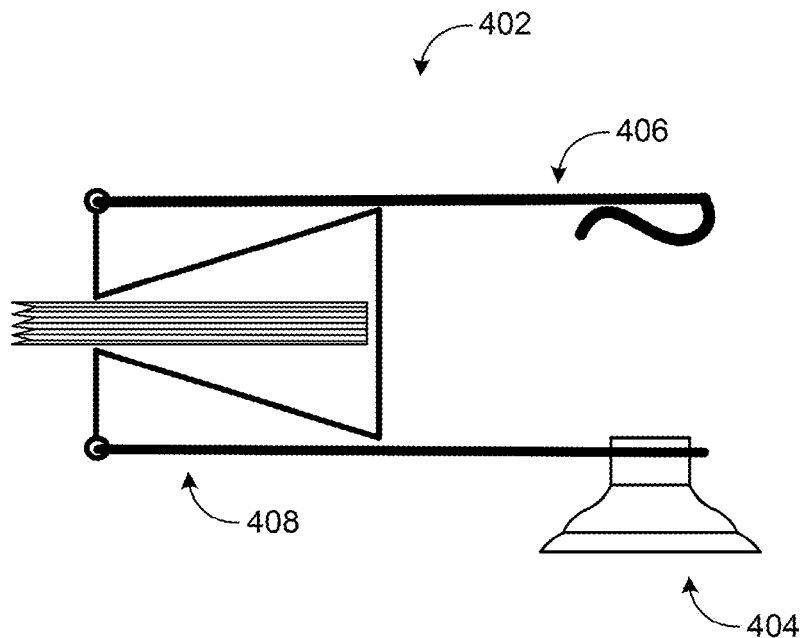
FIG. 4A shows a binder clip including a suction cup.
Figure 4B:
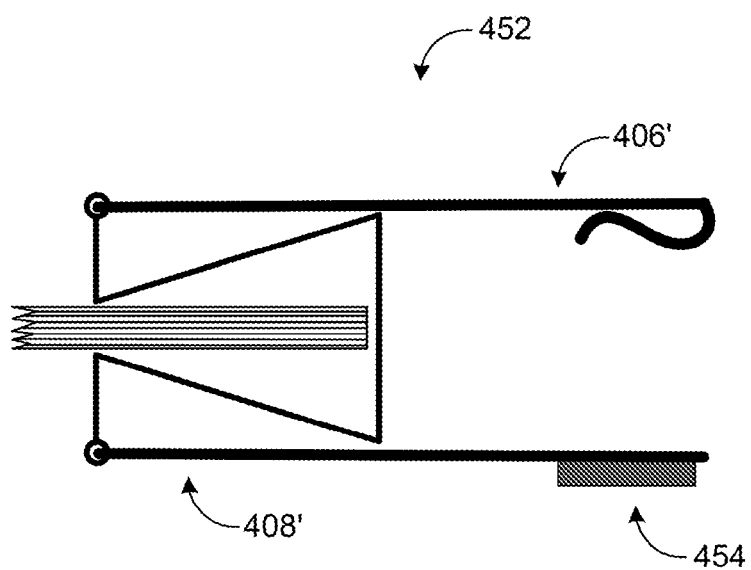
FIG. 4B shows a binder clip including a magnet.

FIGS. 4A and 4B illustrate a binder clip in accordance with the present disclosure augmented with various components. In particular, FIG. 4A shows a binder clip 402 including a suction cup 404 affixed thereto. Suction cup 404 may enable binder clip 402 to be releasably secured to an appropriate surface while the binder clip retains documents or other objects via clamping at its mouth. For example, binder clip 402 may be affixed to a wall or window surface by engaging suction cup 404 with the wall or window surface. In this way, a secure chain of linked binder clips may be formed by linking hook and catch arms, with an initial binder clip of the chain being secured to a surface via suction cup 404. It will be appreciated that the position of suction cup 404 in FIG. 4A is exemplary and not intended to be limiting. In other implementations, suction cup 404 may be reversed (e.g., its engaging surface may be oriented inwardly instead of outwardly as shown in FIG. 4A) and/or the suction cup may be inserted through hook arm 406 and not unhooked arm 408. In some examples, a suction cup may be attached to both hook arm 406 and unhooked arm 408.

Moreover, suction cup 404 may be secured to binder clip 402 in various suitable manners. In one example, the size of a base of the suction cup 404 may be adapted to the size of an aperture of the arm through which the base is inserted, such that the suction cup is releasably secured to the arm when inserted therethrough.

FIG. 4B shows a binder clip 452 including a magnet 454 coupled thereto. Magnet 454 may enable binder clip 452 to be releasably secured to an appropriate surface via magnetic attraction while the binder clip retains documents or other objects via clamping at its mouth. Binder clip 452 may be affixed to a magnetized surface at one end and affixed to a chain of other binder clips at a different end so that the chain may be affixed to the magnetized surface through the initial binder clip. Like suction cup 404, magnet 454 may be positioned to face inward rather than outward as shown in FIG. 4B, and may instead be secured to hook arm 406' rather than unhooked arm 408. In some examples, a magnet may be secured to both hook arm 406' and unhooked arm 408'. Magnet 454 may be secured to binder clip 452 in various suitable manners. In some examples, magnet 454 may be sized such that it may be securely and releasably snapped-in to an aperture of the arm to which it is attached. In other examples, the arm (e.g., unhooked arm 408') to which magnet 454 is attached may be magnetized to enable magnetic attraction between the magnet and arm.

In some implementations, a binder clip including both at least one magnet and at least one suction cup may be provided. In some examples, a magnet may be affixed to a first arm of the binder clip, and a suction cup may be affixed to a second arm of the binder clip. In other examples, a magnet may be affixed to a suction cup, with the magnet-cup assembly affixed to one arm of the binder clip. It will be appreciated that the addition of a magnet and/or suction cup may apply to winged and non-winged binder clips.

In some implementations, a binder clip may be provided whose arms are biased toward one or more angular orientations. FIGS. 5A-C show views of an example binder clip 502 whose arms are biased toward three angular orientations. In particular, first and second arms 504 and 506 of binder clip 502 may be attached to respective hinge assemblies whose geometric configuration enables each arm to be rotated through an angular range, yet, at any given angular position in the angular range, be rotationally biased toward one of the three angular orientations. Additional detail regarding the hinge assemblies is provided below with reference to FIG. 6.

FIG. 5A shows arms 504 and 506 of binder clip 502 assuming the angular orientation of one of its three angular biases. This angular orientation may be referred to as a "folded" orientation. First arm 504 pivots about a first pivot axis 510 of a first hinge 512, and second arm 506 pivots about a second pivot axis 514 of a second hinge 516. First and second pivot axes 510 and 514 extend in and out of the page of FIG. 5A, and in this example are substantially parallel. A threshold force may be required to move one or both of arms 504 and 506 from the folded orientation, such that an arm retains the pivoting orientation when actuated by forces having magnitudes less than that of the threshold force. It will be appreciated that an arm retaining an angular orientation may refer to the angular position of that arm being within a range of angles corresponding to that angular orientation (e.g., 5°).

FIG. 5B shows first arm 504 of binder clip 502 assuming the angular orientation corresponding to an "intermediate" orientation while second arm 506 retains the folded orientation. In this state, first arm 504 may be substantially perpendicular to second arm 506.

FIG. 5C shows first arm 504 of binder clip assuming the angular orientation corresponding to an "extended" orientation while second arm 506 retains the folded orientation. In this state, first arm 504 may be substantially parallel to second arm 506.

Biasing binder clip 502 in this manner may imbue rotation of arms 504 and 506 with a snap-like quality—that is, a given angular orientation may be snapped to as the arms are rotated, with increased resistance being experienced by an operator as the arms assume angular orientations that do not correspond to those of the three angular biases. This resistance drives the arms to assume the angular orientation of one of the three angular biases such that the arms do not continuously rotate with constant resistance throughout their angular range.

While first arm 504 is shown in FIGS. 5A-C as rotating through the three angular biases, it will be appreciated that second arm 506 may rotate through the three angular biases in a similar manner. In some examples, arms 504 and 506 may be concurrently actuated to simultaneously assume the angular orientation of the same angular bias. Further, any of the aforementioned binder clips may be configured with angular biasing. While three stops are described above, a binder clip may be configured to have zero, one, two, four, or more stops. Further, the angles of the stops may be changed relative to what is illustrated.

Figure 6:
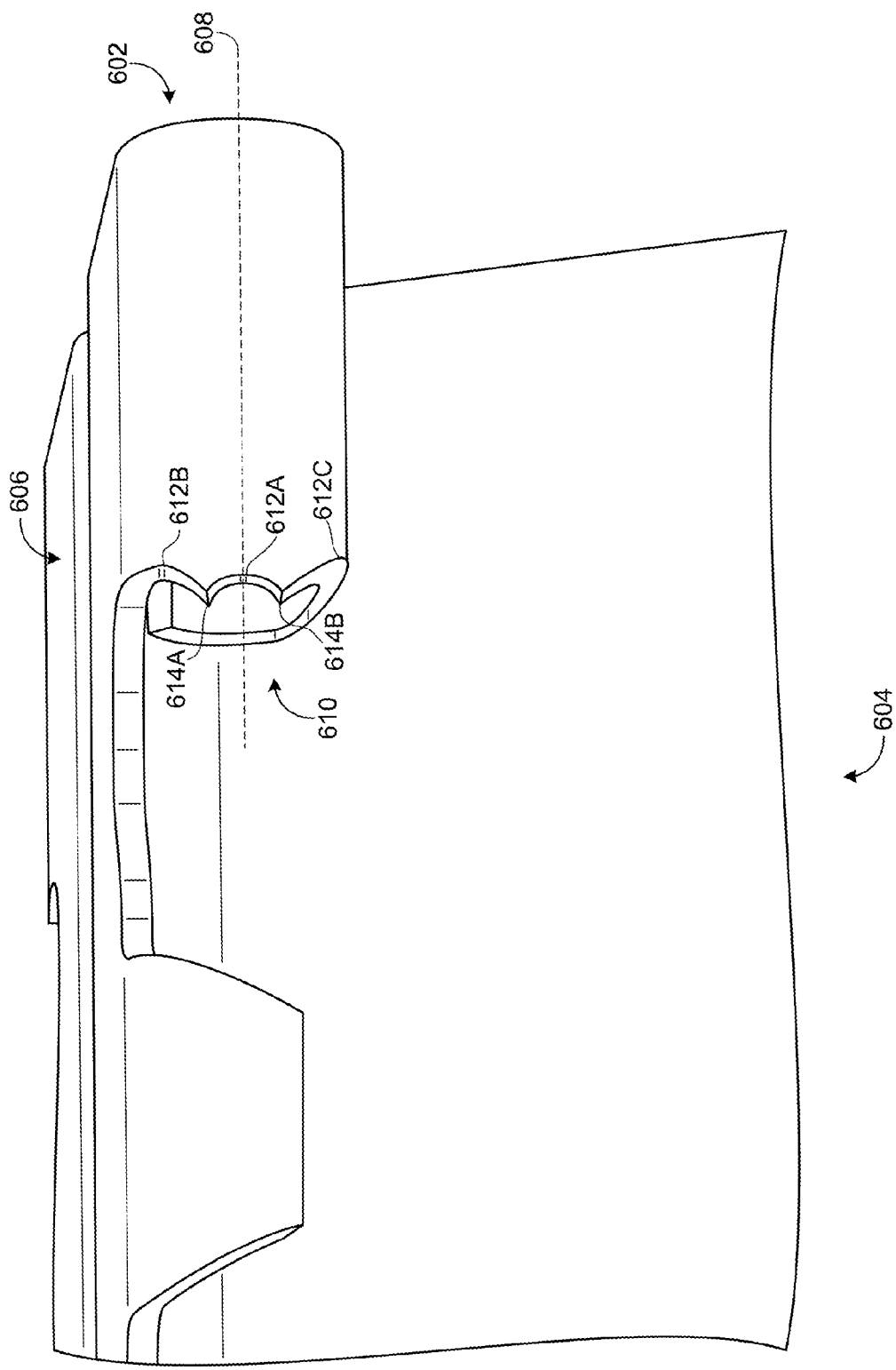
FIG. 6 shows a sectional view of a hinge of the binder clip of FIGS. 5A-5C.

FIG. 6 shows a sectional view of a hinge 602 configured to enable the angular biasing described herein. FIG. 6 specifically shows a sectional view of one side of a binder clip 604 proximate a mouth 606. In the depicted example, hinge 602 includes a pivot axis 608 about which one of two arms (not shown in FIG. 6) of binder clip 604 may rotate. More particularly, a portion of the arm may be inserted through an aperture 610 of hinge 602 to enable rotation of the arm.

Hinge 602 includes three troughs: a middle trough 612A, an outer trough 612B, and an inner trough 612C. Middle trough 612A is separated from outer trough 612B by an outer crest 614A, and is separated from inner trough 612C by an inner crest 614B. The troughs and crests are cooperatively configured such that, as an arm pivots to approach middle trough 612A, an angular position of the arm is increasingly biased toward stopping in the middle trough—for example, when between outer crest 614A or inner crest 614B and the lowest point of the middle trough but approaching the middle trough, the arm is increasingly biased toward stopping at the lowest point of the middle trough. Conversely, as the arm moves away from the lowest point of middle trough 612A toward outer crest 614A or inner crest 614B, the at least partially concave geometry of the troughs provide increasing resistance to rotation of the arm such that the arm is increasingly biased toward returning to the middle trough. Once having surmounted outer crest 614A when moving away from middle trough 612A, however, the arm changes bias to outer trough 612B adjacent (above in FIG. 6) the middle trough. At this point, the angular position of the arm is increasingly biased toward stopping in outer trough 612B. Similarly, as the arm pivots from outer trough 612B to approach outer crest 614A, the arm is increasingly biased toward returning to the outer trough until surmounting the outer crest, at which time the arm changes bias to the middle trough once having surmounted the outer crest.

The biasing associated with outer trough 612B and outer crest 614 similarly applies to inner trough 612C and inner crest 614B. Specifically, once having surmounted inner crest 614B when moving away from middle trough 612A, the arm changes bias to inner trough 612C adjacent (below in FIG. 6) the middle trough. At this point, the angular position of the arm is increasingly biased toward stopping in inner trough 612C. Similarly, as the arm pivots from inner trough 612C to approach inner crest 614B, the arm is increasingly biased toward returning to the inner trough until surmounting the inner crest, at which time the arm changes bias to the middle trough once having surmounted the inner crest.

In the configuration depicted in FIG. 6, outer trough 612B is bounded (below in FIG. 6) by outer crest 614A, and inner trough 612C is bounded (above in FIG. 6) by inner crest 614B. Although one hinge 602 is shown in FIG. 6, it will be appreciated that a second hinge may be provided such that two hinges are provided for a single arm. For a binder clip including two arms, a total of four hinges may be provided. The hinges may include the same or a similar trough and crest configuration as hinge 602. Moreover, it will be appreciated that in some examples, an arm may undergo compression or expansion as its angular position changes to approach or move away from a trough/crest. Further, other numbers of troughs, crests, and angular biases may be employed without departing from the scope of this disclosure.

Figure 7:
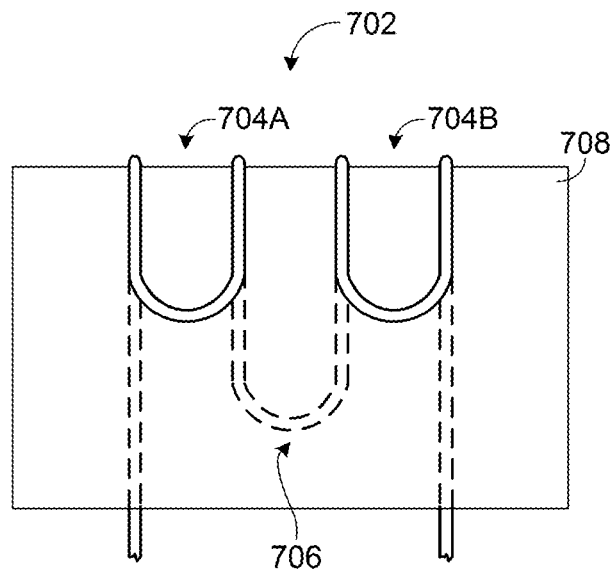
FIG. 7 shows a double hook arm of a binder clip.
Figure 8:
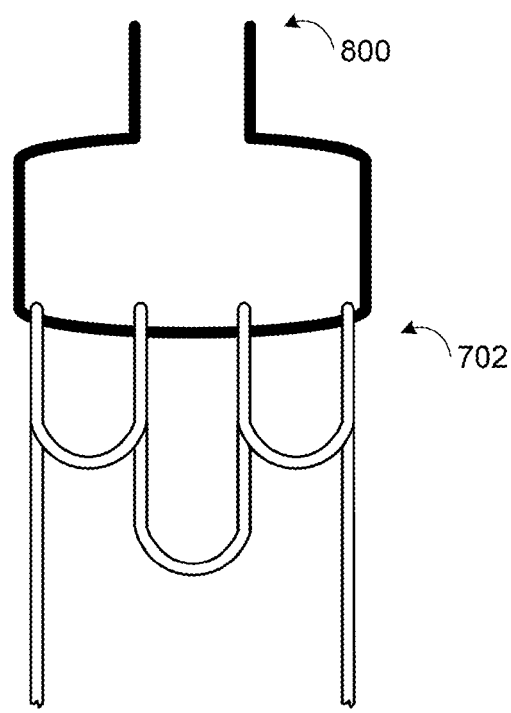
FIG. 8 shows the double hook arm of FIG. 7 hooking the catch of another arm.

FIG. 7 shows a double hook arm 702 of a binder clip. FIG. 8 shows double hook arm 702 hooking the catch 800 of another binder clip arm. Double hook arm 702 includes a first anterior hook 704A, a second anterior hook 704B, and a posterior hook 706. In FIG. 7, a sheet of paper 708 is shown as being releasably secured in double hook arm 702, with components of the arm positioned in front of the sheet of paper shown in solid lines, and components of the arm positioned behind the sheet of paper shown in dashed lines. In FIG. 8, the catch 800 of another binder clip arms is effectively clamped in the same position as paper 708. The hooks of double hook arm 702 cooperate to restrain sheet of paper 708, catch 800, and/or other objects within the hook arm; first and second anterior hooks 704A and 704B impart a force in a first direction (e.g., into the page of FIG. 7), while posterior hook 706 imparts a force in a second direction (e.g., out of the page of FIG. 7) substantially opposite the first direction.

The clearance between first and second anterior hooks 704A and 704B, and posterior hook 706, may be selected based on a desired fit for a class of objects. The springiness of the double hook arm 702 may be further selected based on a desired fit for a class of objects. The horizontal spacing between the anterior hooks may be sized so that the anterior hooks occupy substantially all of the horizontal space provided by catch 800, thus creating a horizontally snug fit that limits sloppiness or play in the connection between the hook arm and the catch arm. The hooks of double hook arm 702 may assume various suitable geometries. For example, first and second anterior hooks 704A and 704B may be substantially S-shaped when viewed from the side. In some examples, first and second anterior hooks 704A and 704B, and posterior hook 706, may be contiguously formed, though in other examples one or more of the hooks may be separately formed and subsequently joined together. While not shown, double hook arm 702 may be pivotably secured (e.g., via one or more hinges) to a binder clip in the manners described above. It will be appreciated that other numbers of anterior and posterior hooks than those shown in FIG. 7 may be employed without departing from the scope of this disclosure; for example, a hook arm may employ one or three or more anterior hooks, and/or two or more posterior hooks.

In view of the many possible embodiments to which the principles of the disclosed binder clips may be applied, it should be recognized that the illustrated embodiments are only examples and should not be taken as limiting the scope of the disclosed subject matter. It will be evident that various modifications may be made without departing from the broader spirit and scope set forth herein. This disclosure should be regarded in an illustrative sense rather than a restrictive sense.

The invention claimed is:

1. A binder clip, comprising:
    a generally triangular clamp, including:
        a first side between a first vertex and a first mouth end;
        a second side between a second vertex and a second mouth end; and
        a third side between the first vertex and the second vertex;
    a catch arm pivotably connected to the first mouth end, the catch arm including a linear segment having a catch width, the linear segment being parallel to the third side and being distal from the first mouth end; and
    a hook arm pivotably connected to the second mouth end, the hook arm including a hook configured for secure but releasable connection around a linear segment of a matching binder clip, the hook having a hook width less than the catch width of the linear segment;
    wherein the first side, the second side, and the third side cooperate to bias the first mouth end toward the second mouth end for clamping items between the first mouth end and the second mouth end, and wherein pivoting the catch arm against the first vertex and pivoting the hook arm against the second vertex separates the first mouth end from the second mouth end to admit items for clamping between the first mouth end and the second mouth end.

2. The binder clip of claim 1, wherein the hook arm includes metal.

3. The binder clip of claim 1, wherein the hook arm includes plastic.

4. The binder clip of claim 1, wherein the catch arm includes metal.

5. The binder clip of claim 1, wherein the catch arm includes plastic.

6. The binder clip of claim 1, wherein the generally triangular clamp includes metal.

7. The binder clip of claim 1, wherein the generally triangular clamp includes plastic.

8. The binder clip of claim 1, wherein the hook is an S-shaped hook coupled to a distal end of the hook arm.

9. The binder clip of claim 1, wherein the catch width is sized to limit sliding of the hook when the hook is connected around the linear segment of the matching binder clip.

10. The binder clip of claim 1, wherein the hook includes a distal curve distal from the clamp, and the hook is sized such that the connection of the hook around the linear segment of the identical binder clip causes the linear segment of the identical binder clip to contact the distal curve of the hook.

11. The binder clip of claim 1, wherein the catch arm includes bent wire.

12. The binder clip of claim 1, wherein the hook arm includes bent wire.

13. The binder clip of claim 1, wherein the linear segment is a segment of straight wire.

14. A binder clip, comprising:
    a generally triangular clamp, including:
        a first side between a mouth and a first vertex;

a second side between the mouth and a second vertex; and a third side between the first vertex and the second vertex;

a first arm pivotably connected to a first hinge of the generally triangular clamp such that the first arm pivots about a first pivot axis of the first hinge; and a second arm pivotably connected to a second hinge of the generally triangular clamp such that the second arm pivots about a second pivot axis of the second hinge, the first pivot axis and the second pivot axis being substantially parallel, at least the first hinge having three troughs, each trough separated from an adjacent trough by a crest, the troughs and crests cooperatively configured such that, as the first arm pivots to approach a middle trough, an angular position of the first arm is increasingly biased toward stopping in the middle trough, and as the first arm pivots to approach a crest, the first arm is increasingly biased toward returning to the middle trough until surmounting the crest, the first arm changing bias to an adjacent trough on another side of the crest once having surmounted the crest.

15. The binder clip of claim 14, wherein, as the first arm pivots from the adjacent trough to approach a crest separating the middle trough from the adjacent trough, the first arm is increasingly biased toward returning to the adjacent trough until surmounting the crest, the first arm changing bias to the middle trough once having surmounted the crest.

16. The binder clip of claim 14, wherein, once having surmounted the crest, the angular position of the first arm is increasingly biased toward stopping in the adjacent trough.

* * * * *